United States Patent
Brock et al.

(10) Patent No.: US 7,125,467 B2
(45) Date of Patent: Oct. 24, 2006

(54) SLIDER PROCESSING SYSTEM UTILIZING POLYVINYL ALCOHOL RELEASE LAYER

(75) Inventors: Phillip Joe Brock, Sunnyvale, CA (US); Michael William Chaw, San Jose, CA (US); Dan J. Dawson, San Jose, CA (US); Craig J. Hawker, Los Gatos, CA (US); James L. Hedrick, Pleasanton, CA (US); Wesley L. Hillman, Morgan Hill, CA (US); Teddie P. Magbitang, Sunnyvale, CA (US); Dennis R. McKean, Milpitas, CA (US); Robert D. Miller, San Jose, CA (US); Richard I. Palmisano, San Martin, CA (US); Jila Tabib, San Jose, CA (US); Mark C. Thurber, San Jose, CA (US); Willi Volksen, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 385 days.

(21) Appl. No.: 10/611,528

(22) Filed: Jun. 30, 2003

(65) Prior Publication Data

US 2004/0266186 A1   Dec. 30, 2004

(51) Int. Cl.
*B32B 37/00* (2006.01)
*G11B 5/127* (2006.01)

(52) U.S. Cl. .............. 156/247; 29/603.07; 29/603.12; 360/230; 360/234.3; 360/235.4; 438/689

(58) Field of Classification Search ............... None
See application file for complete search history.

(56) References Cited

U.S. PATENT DOCUMENTS

| | | | |
|---|---|---|---|
| 3,911,107 A * | 10/1975 | Krezanoski | 424/667 |
| 4,440,830 A | 4/1984 | Wempe | |
| 4,460,490 A * | 7/1984 | Barford et al. | 510/192 |
| 4,576,902 A * | 3/1986 | Saenger et al. | 430/326 |
| 5,077,175 A | 12/1991 | Fryd et al. | |
| 5,652,078 A | 7/1997 | Jalbert et al. | |
| 5,798,179 A | 8/1998 | Kronzer | |
| 6,106,989 A | 8/2000 | Bretscher et al. | |
| 6,342,324 B1 | 1/2002 | Li et al. | |
| 6,358,660 B1 | 3/2002 | Agler et al. | |
| 6,423,471 B1 | 7/2002 | Sorori et al. | |
| 6,922,890 B1 * | 8/2005 | Dai et al. | 29/841 |
| 2002/0102391 A1 | 8/2002 | Kronzer | |

FOREIGN PATENT DOCUMENTS

JP            57090061      *  6/1982

* cited by examiner

Primary Examiner—Justin Fischer
(74) Attorney, Agent, or Firm—G. Marlin Knight

(57) ABSTRACT

A process for fabricating sliders where the sliders are held in place during processing by a solid matrix material is described. A thin coating of a release-layer material is applied on the sliders before encapsulation in the matrix material. The release-layer material is polyvinyl alcohol and more preferably high molecular weight polyvinyl alcohol which is highly hydrolyzed. Use of the release-layer of the invention maintains the process resistance while providing the advantage of allowing easier removal of the matrix material after it is no longer needed. The release-layer can be applied to encapsulant materials including epoxies, acrylates, polyimides, silsesquioxanes and others. After the selected fabrication process such as the formation of air-bearing features an appropriate solvent is applied to soften the polyvinyl alcohol film and allow clean debonding of the sliders.

21 Claims, 3 Drawing Sheets

SLIDER PROCESSING SYSTEM UTILIZING POLYVINYL ALCOHOL RELEASE LAYER

FIELD OF THE INVENTION

The invention relates to the field of manufacturing processes for sliders for magnetic transducers (heads) and more particularly to methods for holding sliders in place during processing by binding the sliders in process resistant material and subsequently removing the process resistant material.

BACKGROUND OF THE INVENTION

In the typical manufacturing process for read/write heads for magnetic storage devices, a large number of sliders are fabricated from a single wafer having rows and columns of the magnetic transducers deposited simultaneously on a wafer surface using semiconductor-type process methods. In various process embodiments, further processing occurs after the wafer is sliced into rows or individual sliders. After slicing each slider has a magnetic head terminating the now exposed air-bearing surface (ABS). Additional processing typically forms the air-bearing features on the ABS.

In a recently described fabrication process, after the magnetic transducer structures have been formed, the wafer is sawed into individual sliders. The individual sliders are attached to an adhesive tape with the surface that will become the ABS (air-bearing surface) facing down. Use of robotic placement tools gives an array of sliders with defined spacing and rotational orientation. A frame or dam with thickness approximately equal to that of the slider is positioned around the outside edge of the array. A liquid such as an epoxy mixture is introduced into the corners and/or edges of the array and allowed to flow into all of the spaces surrounding the sliders. After curing, the sliders are partially encapsulated in the rigid matrix which protects the sides of the individual sliders in the array and provides both dimensional stability during bake and etch steps, as well, as solvent resistance during cleaning and stripping steps. The encapsulated slider array is repositioned so that the air-bearing surface is facing upwards. The array is attached to a fresh carrier by means of an adhesive. The tape over the ABS side is then removed. The slider array surface is planarizied to facilitate processing. An air-bearing pattern is etched into the slider surface using standard photolithography, RIE etch process methodology, etc. Finally the slider array is detached from the carrier and the encapsulation material removed by solvent.

The matrix material between the sliders in the array must withstand a number of stresses including: RIE etch exposure, UV light, temperature cycling up to 110 C, and exposure to several liquids including photoresist solutions, base-containing photoresist developers, propylene glycol methyl ether acetate, IPA, NMP, and water. The encapsulant material must withstand all these conditions without being softened, removed, or distorted by solvent uptake. Damage or distortion of the encapsulant material will result in slider registration failure (resulting in poor lithographic patterning), or photoresist coating flaws; both of which drastically reduce the product yield. After all the fabrication processes are complete, the sliders must be freed from the encapsulant matrix without any matrix material contamination of the slider surfaces. While the resistance to the processing solvents is a requirement, this resistance also makes removing the epoxy difficult.

Outside of the slider processing field release coating compositions have been used for application to various substrates, whereby various materials may be placed in adhering contact with such release-coated substrates and may be easily released at a subsequent time. Release coating compositions commonly in use in commercial and industrial processes contain conventional release agents, such as a silicone polymer, or a stearate chromium complex, or other relatively expensive materials, or other relatively less expensive release agents, such as polyvinyl alcohol.

The invention described in U.S. Pat. No. 5,077,175 to Fryd, et al. concerns a plasticized polyvinyl alcohol release composition for an aqueous or semi-aqueous processible flexographic printing plate comprising: (a) at least 60% of a substantially hydrolyzed polyvinyl alcohol based on the total weight of the release composition; and (b) at least 8% plasticizer, based on the total weight of the release composition.

U.S. Pat. No. 4,440,830 to Wempe describes the use of a polyvinyl alcohol based release coating compositions for strippable substrates which are in contact with pressure sensitive adhesives. Substrates coated with the release compositions are easily peeled from pressure sensitive adhesive coated substrates without substantially adversely affecting the adhesive character of the adhesive coated substrate. The release coating composition comprises polyvinyl alcohol, a migratable release promoting agent, a water soluble salt of a coordinating metal and a water soluble boron compound in an aqueous solution. In addition to composites comprising release coated substrates affixed to adhesive coated substrates, the release compositions can be applied to the backing of a pressure sensitive adhesive tape to permit facile uncoiling of the rolled tape product.

The prior art does not provide a teaching of a method of processing sliders wherein a suitable encapsulation material can be cleanly removed from the sliders at the proper time during the process.

SUMMARY OF THE INVENTION

A process is described for performing fabrication processes on sliders where the sliders are held in place during processing by a solid matrix material. A thin coating of a release-layer material is applied on the sliders before binding in the matrix material. The release-layer material is polyvinyl alcohol and more preferably high molecular weight polyvinyl alcohol which is highly hydrolyzed. Use of the release-layer of the invention maintains the process resistance while providing the advantage of allowing easier removal of the matrix material after it is no longer needed. The release-layer of the invention is highly resistant to bonding with a range of materials which can be employed as matrix materials, such as epoxies, acrylates, polyimides, silsesquioxanes and others. The detailed description of an embodiment of the fabrication of the air-bearing features an appropriate solvent is applied to soften the polyvinyl alcohol film and allow clean debonding of the sliders.

DETAILED DESCRIPTION OF THE INVENTION

Figure 1:
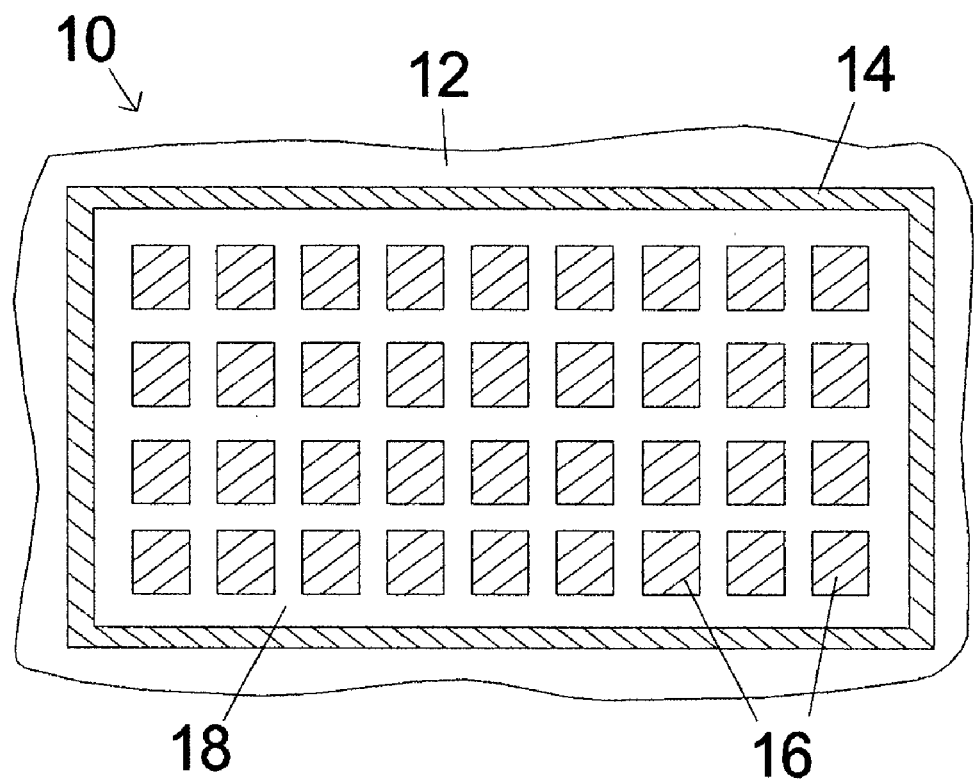
FIG. 1 is an illustration of a top view of an array of separated sliders surrounded by a dam according to the prior art.
Figure 2:
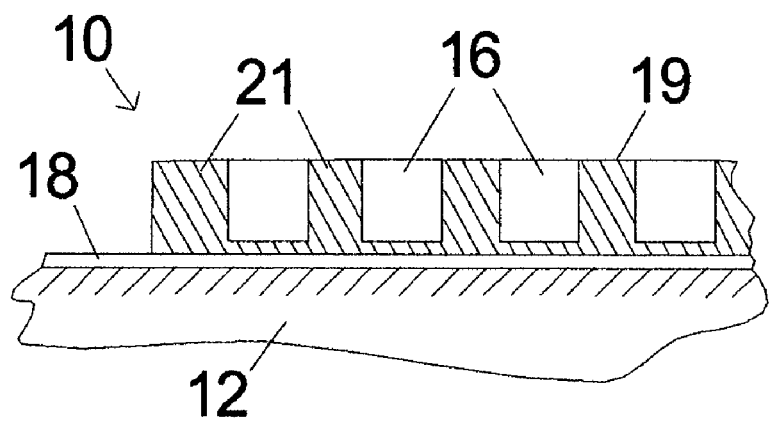
FIG. 2 is an illustration of a section view of an array of separated sliders which are partially encapsulated in a matrix material according to the prior art.

FIG. 1 illustrates a top view of an array of separated sliders 16 that have been mounted on an adhesive surface 18 according to the prior art with their ABS facing down. The array is surrounded by a dam 14 in preparation for a liquid form of a matrix material (not shown) to be poured over the array. The larger support surface 12 may have a multiplicity of sets of sliders and dams (not shown). The support surface 12 and the described elements thereon comprise the workpiece tray 10 which can be inserted into one or more processing chambers or stations. FIG. 2 is a section view of the workpiece tray 10 illustrating the prior art after the liquid form of the matrix material has solidified into the solid matrix material 21 initially encapsulating the sliders 16 except for the ABS forming the slider array block 19 which is separable from the adhesive surface 18. The slider array block 19 is cast with the ABS facing down and being in contact with the adhesive surface 18. After the matrix material has cured, the dam is removed and the slider array block 19 is detached from the adhesive surface 18 and inverted, so that the ABS is facing upwards as shown in FIG. 2 on a renewed adhesive surface 18 such as an adhesive tape. At this stage the sliders are ready for additional processing such as the fabrication is of the air-bearing features (not shown).

Figure 3:
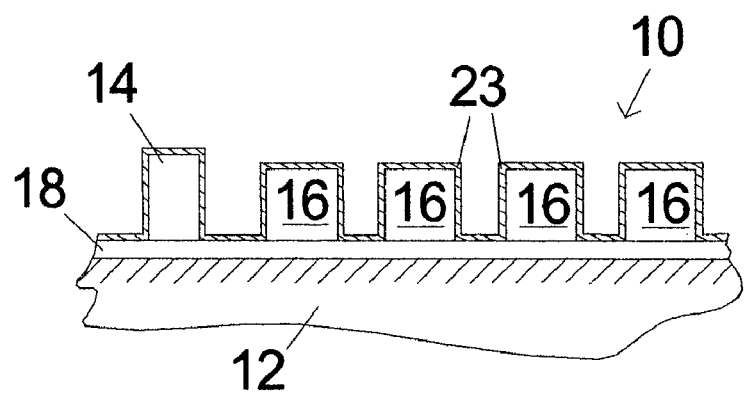
FIG. 3 is an illustration of a section view of an array of separated sliders that have been coated with a release material prior to being partially encapsulated in a matrix material according to the invention.
Figure 4:
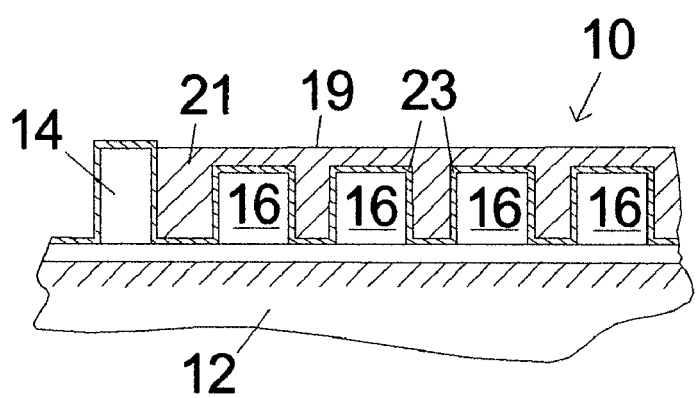
FIG. 4 is an illustration of a section view of an array of separated sliders subsequent to the state illustrated in FIG. 3 after being partially encapsulated in a matrix material according to the invention.
Figure 5:
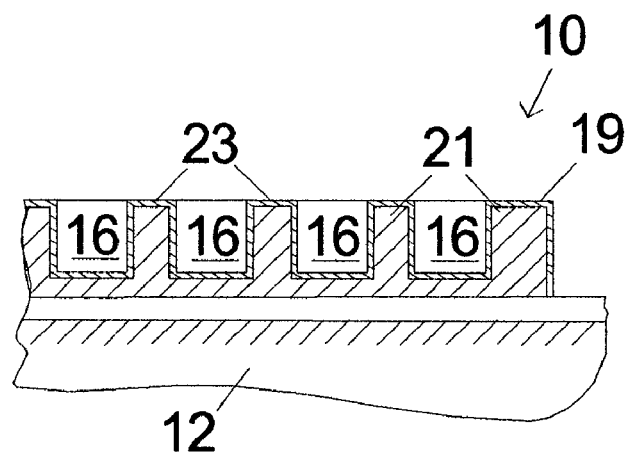
FIG. 5 is an illustration of a section view of an array of separated sliders subsequent to the state illustrated in FIG. 4 after a portion of the matrix material has been removed and the surface of the sliders has been planarized according to the invention.

FIG. 3 illustrates an embodiment of the invention by showing a section of workpiece tray 10 supporting a set of sliders 16 surrounded by a dam 14. The sliders are arranged with the ABS down on an adhesive surface 18. The array of sliders 16 is sprayed with or dipped in a solution of polyvinyl alcohol (PVA). The solution is preferably a dilute solution (0.3–1.0 wt %) of PVA in water and isopropanol. The solution can be air-dried and/or baked to fully removed solvent from the polyvinyl alcohol solution. The result is the formation of polyvinyl alcohol layer 23 on the exposed sides of the sliders 16. FIG. 4 illustrates the state of the process after the matrix material 21 has been formed around the exposed sides of the polyvinyl alcohol coated sliders to form slider array block 19. FIG. 5 illustrates the state of the process after the dam has been removed and the slider array block 19 has been flipped over so that the ABS is now the top surface. Since the ABS was not exposed when the polyvinyl alcohol solution was applied, it will be relatively free of the polyvinyl alcohol coating. The array is ready for the fabrication of the air-bearing features at this point. The ABS of the sliders would typically be planarized next as an initial step in the conventional process of forming the air-bearing features on the sliders which would remove any fringes of the coating from the ABS.

Figure 6:
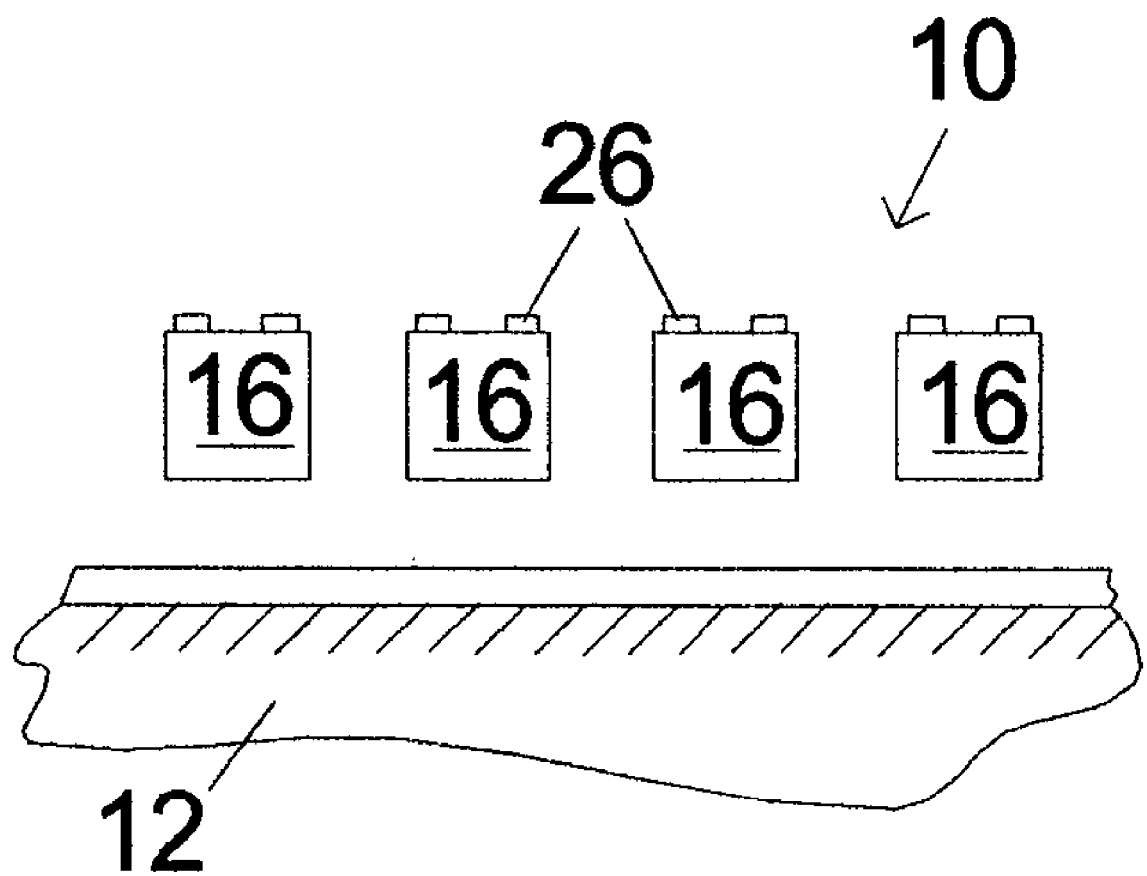
FIG. 6 is an illustration of a section view of an array of separated sliders subsequent to the state illustrated in FIG. 5 after the air-bearing features have been formed and the matrix material and the polyvinyl alcohol coating have been removed according to the invention.

The photolithographic and thin film processes used to form the air-bearing features are outside the scope of this disclosure. The polyvinyl alcohol release layer according to the invention can be used with a variety of processes so long as the specific polyvinyl alcohol composition will survive the solvents and conditions used therein. As noted these typically includes reactive ion etching (RIE), UV light, temperature cycling up to 110 C, and exposure to several liquids including photoresist solutions, base-containing photoresist developers, propylene glycol methyl ether acetate, IPA, NMP, and water. FIG. 6 illustrates the state of the process after the air-bearing features 26 have been formed and the matrix material and polyvinyl alcohol release layer have removed by a process which includes use of a solvent to soften the polyvinyl alcohol layer release layer to allow clean debonding of the sliders 16 by mechanical means.

The polyvinyl alcohol layer according to the invention allows epoxy to be used as the matrix material. The release layer of the invention can be applied to any number of encapsulant materials such as acrylates, polyimides, silsesquioxanes and others.

A detailed description of an experiment will be described. This example uses polyvinyl alcohol in a solution of isopropanol and water. The polyvinyl alcohol may be a commercially available polyvinyl alcohol. Polyvinyl alcohol having a percentage hydrolysis of about 95 or above is preferred. The molecular weight of the polyvinyl alcohol is preferably in the range of from about 124 k to about 180 k daltons. One advantage to the preferred polyvinyl alcohol species is that it has very low solution viscosity in isopropanol/water solution and, therefore, tends to wick up the sides of the slider. This wicking tendency is an advantage, since it results in a more substantial coating of the sides of the sliders than would otherwise happen and thereby improves the debonding. The low solution viscosity also helps to prevent bridging between the sliders The experiment was conducted using the commercial epoxy "EPO-TEK 301" (from Epoxy Technology, Billerica, Mass.) as the matrix material. When applied without the release layer of the invention EPO-TEK was found to satisfy the processing criteria, but the cured epoxy material could not be removed cleanly from the sliders at the end of the fabrication process. The experiment was then repeated using of a thin coating of the polyvinyl alcohol release layer on the sliders before the epoxy was applied. The release-layer solution was polyvinyl alcohol included in a 1:2 solution of isopropanol and water with 0.35 weight % polyvinyl alcohol. The solution was prepared by dissolving 0.50 g polyvinyl alcohol in 50 ml of boiling water and then diluting to the cloud point which required approximately 25–30 ml isopropanol to yield 0.375 wt % solution of polyvinyl alcohol. The polyvinyl alcohol had a percentage hydrolysis of about 99%. The molecular weight of the polyvinyl alcohol used in the experiment was approximately 124–180 k daltons.

The slider array was placed inside a stainless dam. The release layer solution was applied to the slider array by flooding the array surface using, removing any excess by use of a "doctor blade". The solution was air-dried for 15 minutes whereupon the polyvinyl alcohol adhered to the sides of the sliders in the array. Air baking on a hotplate first for 10–15 minutes at 85 C, followed by 10–15 minutes at 115 C fully removed solvent from the polyvinyl alcohol layer. At this point the polyvinyl alcohol-treated array can be encapsulated with epoxy or almost any other matrix material desired. The polyvinyl alcohol coating prevents "bonding" of the matrix material to the slider surfaces but allowed the matrix material to mechanically hold the sliders on the fixture and fill the gaps between sliders. After processing the sliders, the array can be treated with hot (80–100 degree C.) n-methyl-2-pyrrolidone (NMP); 1,3-dimethyl 3,4,5,6-tetrahydro-2(1H)-pyrimidone (dimethylpropyl urea, DMPU); boiling water; or water/NMP mixtures to dissolve the polyvinyl alcohol layer and release the sliders. Using EPO-TEK epoxy as the matrix material, the sliders could be debonded cleanly from the epoxy matrix by DMPU without swelling/softening the epoxy. However, the use of NMP resulted in some undesirable redeposition of solvent-swollen epoxy.

Although this invention has been described with respect to specific embodiments, the details thereof are not to be construed as limitations, since it will be apparent that various embodiments, changes and modifications may be made without departing from the spirit of the invention and such embodiments are intended to be within the scope of the invention.

What is claimed is:

1. A method for manufacturing a slider comprising the steps of:
   applying a liquid solution of a first solvent and polyvinyl alcohol to the slider;
   drying the slider to remove the first solvent from the liquid solution leaving a polyvinyl alcohol film on the slider;
   binding the slider in a matrix material with the polyvinyl alcohol film being in contact with the matrix material;
   performing a selected process on the slider while the slider is held in the matrix material; and
   removing the matrix material and the polyvinyl alcohol film from the slider by a method including use of a second solvent to soften the polyvinyl alcohol film.

2. The method of claim 1 wherein the matrix material and the polyvinyl alcohol film are resistant to a third solvent and the selected process forms an air-bearing pattern and includes use of the third solvent.

3. The method of claim 1 wherein the polyvinyl alcohol has a percentage hydrolysis of about 95% or greater.

4. The method of claim 1 wherein the polyvinyl alcohol has a percentage hydrolysis of about 99% or greater.

5. The method of claim 1 wherein the matrix material is an epoxy, acrylate, polyimide or silsesquioxane.

6. The method of claim 1 wherein the polyvinyl alcohol has a molecular weight of about 124,000 to about 180,000 daltons.

7. The method of claim 1 wherein the first solvent comprises isopropanol.

8. The method of claim 2 wherein the first solvent comprises isopropanol and water.

9. The method of claim 1 wherein the step of drying the slider further comprises baking at a first temperature followed by baking at a second temperature where the second temperature is higher than the first temperature.

10. The method of claim 1 wherein the second solvent comprises hot n-methyl-2-pyrrolidone.

11. The method of claim 1 wherein the second solvent comprises dimethylpropyl urea.

12. The method of claim 1 wherein the second solvent comprises boiling water.

13. A method for manufacturing sliders for use in disk drives comprising the steps of:
    attaching the sliders to a support surface;
    applying polyvinyl alcohol in a solution comprising water to the sliders;
    drying the sliders leaving a coating of polyvinyl alcohol on the sliders;
    binding the sliders in a solid material which is resistant to a first solvent and to processing conditions of a selected photolithographic process;
    using the selected photolithographic process to form air-bearing features on a surface of the sliders; and
    applying a second solvent to soften the coating of polyvinyl alcohol to aid in removing the solid material from the sliders.

14. The method of claim 13 wherein the polyvinyl alcohol has a percentage hydrolysis of about 95% or greater.

15. The method of claim 13 wherein the matrix material is an epoxy, acrylate, polyimide or silsesquioxane.

16. The method of claim 13 wherein the polyvinyl alcohol has a molecular weight of about 124,000 to about 180,000 daltons.

17. The method of claim 13 wherein the solution of polyvinyl alcohol comprises isopropanol.

18. The method of claim 13 wherein the step of drying the slider further comprises baking at a first temperature followed by baking at a second temperature where the second temperature is higher than the first temperature.

19. The method of claim 13 wherein the second solvent comprises hot n-methyl-2-pyrrolidone.

20. The method of claim 13 wherein the second solvent comprises dimethylpropyl urea.

21. The method of claim 13 wherein the second solvent comprises boiling water.

* * * * *